March 18, 1941.  W. F. WESTENDORP  2,235,543
ELECTRIC VALVE CIRCUIT
Filed Feb. 16, 1939  4 Sheets-Sheet 1
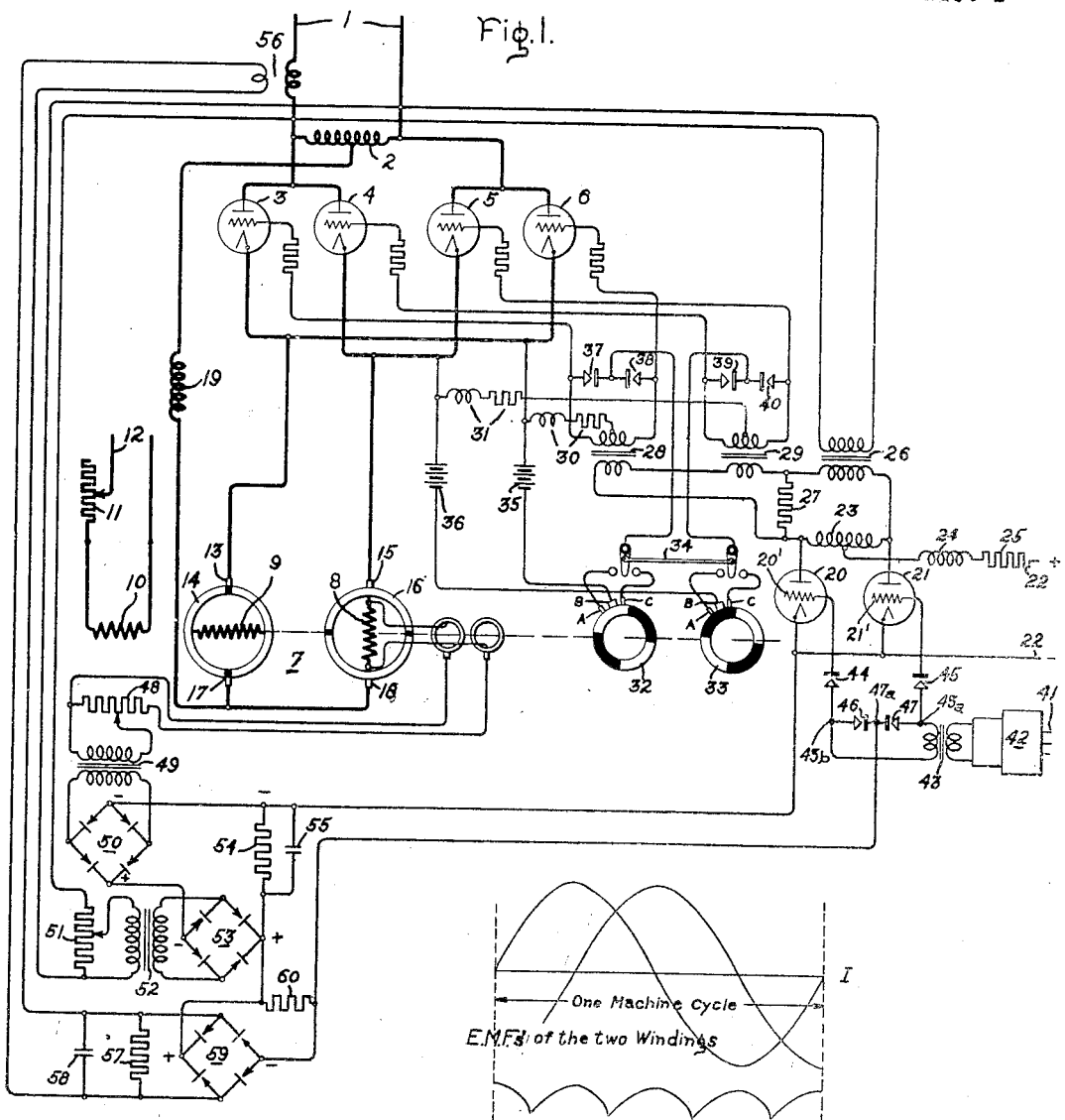
Fig. 1.
Fig. 2.
Absolute Values of Currents
a: Full Load; b: Light Load.
(Ripple disregarded)
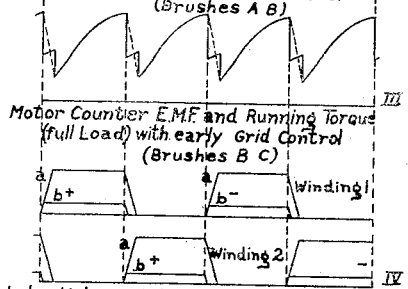
Inventor:
Willem F. Westendorp,
by Harry E. Dunham
His Attorney March 18, 1941.  W. F. WESTENDORP  2,235,543
ELECTRIC VALVE CIRCUIT
Filed Feb. 16, 1939  4 Sheets-Sheet 2

Inventor:
Willem F. Westendorp,
by Harry E. Dunham
His Attorney.

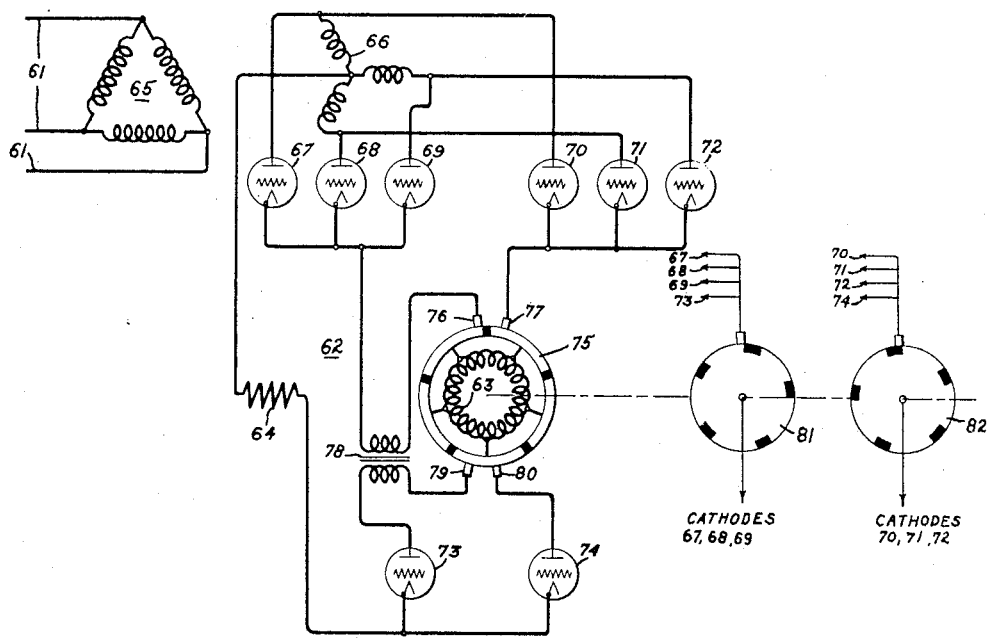
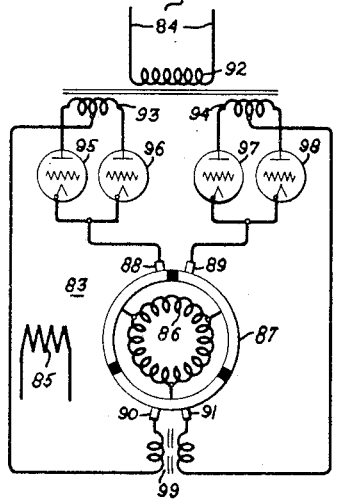
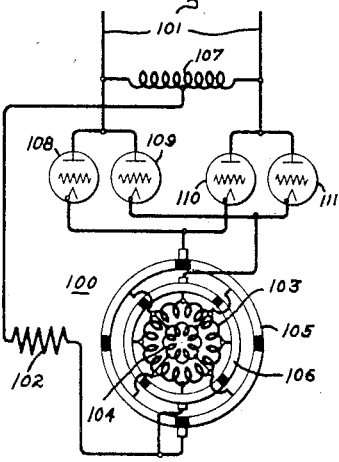

Patented Mar. 18, 1941

2,235,543

UNITED STATES PATENT OFFICE 2,235,543

ELECTRIC VALVE CIRCUIT

Willem F. Westendorp, Schenectady, N. Y., assignor to General Electric Company, a corporation of New York Application February 16, 1939, Serial No. 256,683

10 Claims. (Cl. 172—274)

My invention relates to motor control systems and more particularly to such systems utilizing electric valve converting apparatus.

It has been frequently found desirable to control direct current motors by means of electric valve converting systems so as to obtain certain desirable output characteristics, but many of the prior arrangements did not provide any means for conveniently and simply adjusting the apparatus so as to produce a different output characteristic for a particular series of operations. It furthermore would be desirable if conventional direct current machines, which are modified but slightly, could be utilized so as to operate from relatively high voltage sources. In some instances it would also be desirable to limit the current through the motor to a predetermined amount.

It is, therefore, an object of my invention to provide an improved motor control system utilizing an electric valve translating system which will overcome certain of the disadvantages of the arrangements of the prior art and which will provide many of the desired requirements mentioned above.

It is another object of my invention to provide an improved motor control system by which any one of the predetermined number of output characteristics of the motor may be obtained.

It is a further object of my invention to provide an improved motor control system operated from an electric valve translating apparatus in which the amount of current flowing through the motor may be controlled so as to safeguard the motor.

It is a still further object of my invention to provide an improved motor control system in which a conventional motor with slight modifications may be energized from a relatively high voltage source.

Figure 3:
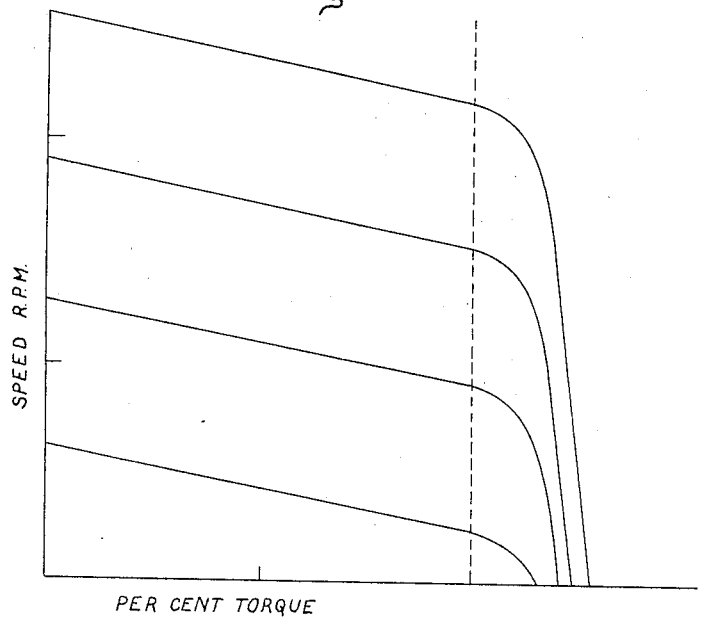
Figure 4:
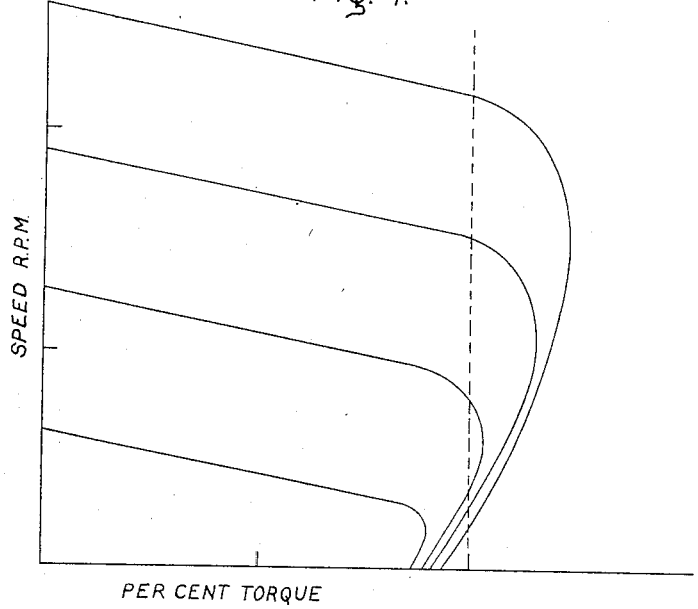
Figure 8:
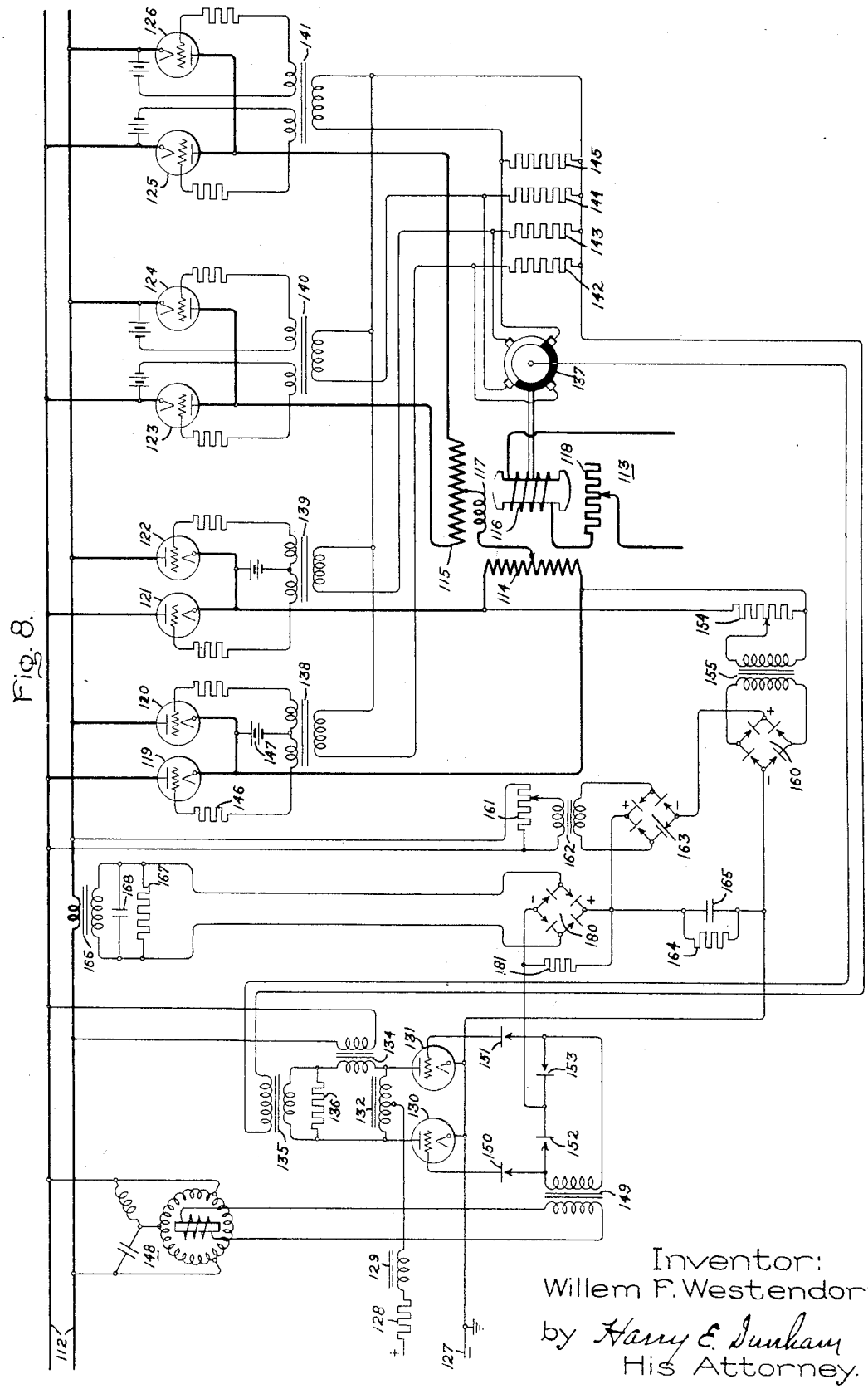

For a better understanding of my invention, together with other and further objects thereof, reference is had to the accompanying drawings, and its scope will be pointed out in the appended claims. In the drawings, Fig. 1 illustrates my invention as applied to a system operating from a source of alternating current; Figs. 2, 3 and 4 are explanatory of the operation and the various output characteristics obtained by the arrangement shown in Fig. 1; Figs. 5, 6 and 7 show various arrangements illustrating how a direct current motor, slightly modified, may be energized from a relatively high voltage source and Fig. 8 shows the application of certain principles illustrated in Fig. 1 to an alternating current motor of the synchronous type.

Referring now more particulary to Fig. 1, I have shown therein an alternating current supply circuit 1 which is connected to an electric valve converting apparatus comprising an inductor 2 and a plurality of electric valves 3, 4, 5 and 6. This electric valve converting apparatus interconnects the source of supply 1 with an electrical motor 7 having armature windings 8 and 9 and a field 10. The field 10 is separately excited through resistor 11 from direct current source 12. In the arrangement shown the electric valves 3 and 4 have their anodes connected to one terminal of the inductor 2 and the other terminal of the inductor 2 is connected to the anodes of the valves 5 and 6. The cathodes of the valves 3 and 6 are connected to a brush 13 which cooperates with a commutator ring 14 of the armature winding 9. The cathodes of the valves 4 and 5 are connected together to the brush 15 which cooperates with the commutator ring 16 of the armature 8. The output brushes 17 and 18 of the armature windings 8 and 9 are connected together through a smoothing reactor 19 which in turn is connected to an intermediate point on the inductor 2. For purposes of simplicity in illustration and explanation the valves 3 to 6 have been shown as being of the type having a cathode, an anode and a control grid, although it is to be understood that any of the valves of the type having an anode, a cathode, a control or starting electrode all contained within an envelope containing an ionizable medium may be utilized and that obviously with different types of valves slight modifications may be made in the control circuit.

The control circuit for the arrangement illustrated in Fig. 1 includes an electric valve inverter comprising a pair of valves 20 and 21 which are energized from a source of direct current 22. Electric valves 20 and 21 have control members 20' and 21', respectively. The cathodes of the valves 20 and 21 are connected together to one side of the direct current circuit 22 and the anodes are each connected to the outer terminals of an inductor 23, the midpoint of which is connected through a smoothing reactor 24 and a resistor 25 to the other side of the direct current circuit 22. The output of the electric valve converting apparatus is taken from across the inductor 23. The wave shape of the voltages appearing across the inductor 23 are substantially rectangular in shape. This voltage, together with a sinusoidal alternating current voltage obtained from the source 1 by means of a transformer 26 is connected so as to appear across a resistor 27 which resistor is connected to the series connected primary windings of a pair of control transformers 28 and 29. The outer extremities of the secondary winding of the control transformer 28 are connected to the control electrodes of the valves 3 and 6 through suitable current limiting resistors. Similarly, the outer terminals of the secondary winding of the transformer 29 are connected to the control electrodes of the valves 4 and 5 through suitable current limiting resistors. The midpoint of the secondary winding of the control transformer 28 is connected through an inductor and resistor 30 to the cathodes of the valves 3 and 6 and similarly the midpoint of the secondary winding of the control transformer 29 is connected through an inductor and resistor 31 to the cathodes of the valves 4 and 5. This arrangement insures a constant flow of current from the cathode through the inductances 30 and 31 to either one of two grids so that whenever the electric valve converting apparatus is called upon to supply energy one of the control grids of each pair of valves will always be ready to start operation. The control potential supplied to these valves, however, is furthermore controlled in accordance with the speed of the machine 7 by mounting a pair of distributors 32 and 33 on the shaft of the machine 7. Each of the distributors 32 and 33 is provided with a plurality of brushes identified as brushes A, B and C. The brushes A and C are connected to the switch points of a switch arrangement 34. The remaining brushes B of the distributors 32 and 33 are connected, respectively, through sources of biasing voltage 35 and 36 to the cathodes of the valves 3, 6, and 4, 5. The switching bar 34 is provided with two switch arms which are connected respectively, to the common juncture point of a plurality of pairs of contact rectifiers 37, 38 and 39, 40. The unilaterally conductive devices or contact rectifiers 37 and 38 are connected across the secondary winding of the control transformer 28 and the common juncture between these rectifiers is connected to the switch arm which is connected to the brushes A and C of the distributor 32. Similarly, the unilaterally conductive devices or contact rectifiers 39 and 40 are connected across the secondary winding of the control transformer 29, and the common juncture point of these rectifiers is connected to the switch arm which is arranged to contact the brushes A and C of the distributor 33. The switch 34 is thrown in one position for the starting operation and in the other position for the running operation of the motor 7. The manner in which this may be accomplished will become more apparent with the description of the operation of the system. Thus the application of the control voltages supplied by the inverter including the valves 20 and 21 is determined by the commutator means 32 and 33 in accordance with the speed of the machine 7.

The control voltages supplied by the inverter comprising the valves 20 and 21 may be shifted in phase by controlling the moments of ignition of the valves 20 and 21. The control circuit for these valves includes a source of alternating current 41 which is connected to a suitable phase shifting means 42 the output of which energizes the control transformer 43. One terminal 43b of the secondary winding of the control transformer 43 is connected through a unilaterally conductive device 44 to the control grid or electrode of the valve 20 and similarly the other terminal 43a of the secondary winding of the transformer 43 is connected through a unilaterally conductive device 45 to the control electrode of the valve 21. An intermediate point 47a for the secondary winding of the control transformer 43 is formed by utilizing two unilaterally conductive devices 46 and 47 connected in opposite sense, thus establishing the potential of this point as equal to the potential of the positive of the two terminals of the secondary winding. Between the juncture 47a of these two unilaterally conductive devices and the cathodes of the valves 20 and 21 there is supplied a plurality of components of positive and negative bias which determines the time at which the valves 20 and 21 are to become conductive thus controlling the phase of the power output appearing across the inductor 23. The various biasing components which are effective between the cathodes of the valves 20, 21 and the juncture point 47a between these contact rectifiers are unilaterally conductive devices 46 and 47 operate to determine the power output characteristics of the motor 7. Unidirectional conducting devices 44—47 may be of the copper oxide type such as that disclosed and claimed in United States Letters Patent No. 1,640,335 granted August 23, 1927, on an application of L. O. Grondahl. One component of positive bias voltage which is responsive to an electrical condition of the motor 7 is obtained by connecting an adjustable resistor 48 across the armature winding 8 of the motor 7 and is, therefore, proportioned to the voltage of this winding and to the speed of the motor. A portion of voltage appearing across the resistor 48 is impressed across the primary winding of a transformer 49, the secondary winding of which is connected to a bridge rectifier 50 which supplies a direct current component proportional to the speed of the motor 7. An adjustable resistor 51 is arranged to be energized from the alternating current circuit 1 and a portion of the voltage appearing across this adjustable resistor 51 is impressed upon the primary winding of a transformer 52. The secondary winding of the transformer 52 is connected to a bridge rectifier 53, the output of which is substantially constant and applied as a positive bias. The outputs of the bridge rectifiers 50 and 53 are connected in series so as to appear across a resistor 54 which is bypassed by a suitable capacitor 55 so as to filter the positive bias voltage and render the alternating ripple relatively small. Another direct current voltage component which is proportional to the current supplied to the electric valve converting apparatus is obtained by connecting a current transformer 56 in series with the one conductor of the alternating current circuit 1 and impressing the voltage appearing in the secondary winding of the transformer 56 across a resistor 57 which may be bypassed by a suitable capacitor 58. The voltage appearing across the resistor 57 is impressed upon a bridge rectifier 59 the output of which appears across a resistor 60 as a negative bias component. The resistors 54 and 60 are connected in series so that the voltage components appearing across these resistors are in series between the cathodes of the valves 20 and 21 and the common juncture between the unilaterally conductive devices 46 and 47. An explanation of the starting operation of the apparatus shown in Fig. 1 will be facilitated by reference to Fig. 2 wherein curves I, II, III and IV show the operation of the apparatus over one machine cycle. Curve I shows the electromotive forces of the armature windings 8 and 9; curve II shows the counter-electromotive force of the motor and the starting torque with the switch 34 thrown to the left-hand position; curve III shows the counter-electromotive force and full load operating torque with the switch 34 thrown to the right-hand operating position and curve IV shows theoretical values of the current at full load and at light load. In order to start the electric valve apparatus including the valves 3, 4, 5 and 6 in accordance with the machine cycle the unilaterally conductive devices 37, 38, 39 and 40 provide midpoints so that potentials are obtained equal to those of the most positive control grids. In the position shown for the commutator 32 it is seen that with the switch 34 thrown to the left-hand operating position the midpoint between the unilaterally conductive devices 37 and 38 is connected so that the grids of the valves 3 and 6 are at a negative potential due to the effects of the biasing potential 35. The contact duration of a pair of brushes such as brushes A and B on ring 32 and also A and B on ring 33 is a little less than 90 degrees of the machine cycle so that no starting position is possible in which all four valves are biased off. As soon as the motor 16 begins to rotate in counterclockwise direction, the switch 34 is thrown to the right-hand position. This may be accompanied by a suitable relay means (not shown). By referring to Fig. 2 it will readily become apparent to those skilled in the art how switch 34 together with the two sets of brushes A and C operate to provide proper operation for the starting and running conditions of the motor 7. The starting torque obtained with brushes A is smooth as is apparent from the curve II and there are no inoperative portions which would tend to make starting difficult. During the running operation it is necessary to provide a large difference in the counter-electromotive force between the two windings so that this counter-electromotive force will operate as a commutating voltage sufficient to transfer the load current between the various valves and for this purpose the control is advanced to brushes C. The vertical dotted lines in curve III and in curve IV indicate the moments at which the control potentials permit commutation to begin. It will be noticed that the motor counter-electromotive force has approximately the same wave shape as the force exerted on the rotor and this is due to the fact that the instantaneous electrical power output is equal to the instantaneous mechanical power output provided no energy is lost or stored. As the current and the angular velocity are constant it readily follows that the voltage is proportional to the force and therefore has the same wave shape. Only when the energy stored in the reactance of one machine winding is slowly transferred to the other winding is there a difference in the wave shape as is indicated in curve III by the slanting dotted line.

The manner in which the remaining portion of the control circuit for the valves 3, 4, 5 and 6 operates can best be understood by referring to Figs. 3 and 4 in connection with Fig. 1. Figs. 3 and 4 show families of curves which may be obtained by suitable adjustments of the remaining elements of the control circuits to produce predetermined torque curves for the motor 7. The voltage supplied by the inverter utilizing valves 20 and 21 is primarily a rectangular wave shaped voltage since the alternating current voltage supplied by the transformer 26 operates primarily as a commutating voltage for the valves. The phase of this rectangular wave shape voltage, however, depends on the control voltage supplied to the valves 20 and 21. This control voltage may become effective at different moments due to the direct current bias connected in series between the cathodes of the valves 20 and 21 and the midpoints of the unilaterally conductive devices 46 and 47 which are connected across the secondary winding of the control voltage transformer 43. The unilaterally conductive devices 44 and 45 connected in the circuit to the grids of the valves 20 and 21 operate to prevent a strong positive ion current from reaching the negative grid in an ionized tube thereby overloading the control circuit consisting of 43, 54, 60 and adjacent elements. The unilaterally conductive devices 46 and 47 limit the forward grid current supplied by the source of positive bias to a relatively small value since they oppose this low current. As long as the positive bias supplied by the bridge rectifiers 53 and 50 exceeds the negative bias which is supplied by bridge rectifier 59 the control of the valves 20 and 21 is primarily dependent upon the alternating current voltage supplied by the transformer 43 as adjusted by the phase shifting device 42. As soon as the negative bias supplied by the bridge rectifier 59 exceeds the positive bias supplied by the bridge rectifiers 50 and 53 neither of the control electrodes of the valves 20 and 21 can be rendered positive by the alternating current supplied from the transformer 43, and the commutation of the current between the valves is delayed until the negative bias has decreased sufficiently. The negative bias becomes zero twice per cycle as it is derived from alternating current forces without any filtering action. This feature by permitting the negative bias to become zero twice per cycle insures a stability of operation of the control system. The negative bias supplied by the bridge rectifier 59 is proportional to the current supplied to the electric valve converting apparatus including the valves 3 to 6 and hence it will be apparent to those skilled in the art that the control of these valves will be retarded if the current supplied to the valves exceeds a predetermined amount. If the positive bias component is kept constant instead of being responsive to an electrical condition of the motor 7 a curve corresponding to those curves shown in Fig. 3 will be obtained. The individual curves are chosen by adjustment of phase shifting device 42. If the positive bias increases as the speed of the motor 16 increases, curves of the type shown in Fig. 4 will be obtained, each curve corresponding to a particular setting of phase shifter 42. By adjusting the amount of potential derived from the adjustable resistors 48 and 51 any number of different curves representing the speed torque relations or output characteristics of the motor 7 may be obtained. It furthermore will be noticed that since the positive bias supplied by the bridge rectifier 53 is obtained from the same source of power supplied to the motor, any failure of this power will reduce this bias to zero so that whenever proper current conditions are again resumed, a smooth power flow without surges will result irrespective of the initial adjustment of the phase shifting device 42.

An important feature of my invention is the precision of control and operation effected by the excitation circuit for electric valves 20 and 21. This control circuit is of particular utility in connection with the control of electric valve apparatus used in frequency changing circuits or in the control of dynamo-electric machines which are energized from alternating current supply circuits. Inasmuch as unidirectional conducting devices 46 and 47 are connected in opposition and are connected in series relation across the terminals 43a and 43b of the secondary winding of transformer 43, the potential of the point 47a assumes substantially the potential of the more positive terminal of terminals 43a or 43b. For example, when the terminal 43a is positive relative to terminal 43b, point 47a attains substantially the potential of terminal 43a inasmuch as the unidirectional conducting device 47 is connected to transmit positive current and hence the resistance drop through this device is substantially zero. However, substantially the entire voltage of the secondary winding of transformer 43 appears across the terminals of the unidirectional conducting device 46 since the current is flowing in opposition to the normal direction of current through the device 46. Accordingly, the control voltage derived from 50, 53, 59 is impressed on the control member 21' of electric valve 21, rendering the electric valve conductive at the desired instant, and a substantial negative voltage is available to maintain the valve 20 nonconductive. By utilizing the excitation circuit as disclosed, it will be understood that the system is sensitive to variations in the summation of the variable unidirectional voltages derived from rectifiers 50, 53 and 59 and effects a positive and reliable control, since these unidirectional voltages precisely affect the control of the potential of either the control members 20' and 21' of electric valves 20 and 21, respectively. The unidirectional voltages provided by rectifiers 50, 53 and 59 are applied as selected by the potential provided by the secondary winding of transformer 43 and these potentials act conjointly with the voltage of transformer 43 to control the conductivities of electric valves 20 and 21 conjointly in accordance with the phase of the voltage of transformer 43 as adjusted by means of phase shifter 42. The unidirectional conducting devices 44 and 45 permit the transmission of normal grid current to the electric valves 20 and 21 when the terminals 43b and 43a are positive, respectively, but prohibit the transmission of current due to the deionization of the medium of electric valve means 20 and 21.

In Fig. 5 I have shown how a high voltage source of current 61 may be used to energize a direct current machine 62 which comprises a closed armature winding 63 and a field winding 64. These windings of the motor 62 are interconnected with the alternating current supply 61 by a transformer having a primary winding 65, a secondary winding 66 and a plurality of electric valves 67 to 74, inclusive. The valves 67 to 69 have a common cathode connection and each of the anodes is connected to a different one of the extremities of the secondary winding 66. Similarly, the valves 70 to 72 have a common cathode connection and each of the anodes are connected to different extremities of the secondary winding 66. The neutral point of the secondary winding 66 is connected through a field winding 64 of the motor 62 to the cathodes of the valves 73 and 74.

The armature winding 63 is connected to a commutator 75 having a relatively small odd number of conductive segments and insulating segments. A pair of input brushes 76 and 77 which are angularly displaced from each other relative to the armature winding 63 are connected so that the brush 76 is connected through one winding of a transformer 78 to the common cathode connection of the valves 67, 68 and 69, whereas the brush 77 is connected to the common cathode connection of the valves 70, 71 and 72. A pair of output brushes 79 and 80 are provided which are angularly displaced from each other relative to the armature winding 63 and brush 79 is connected through the secondary winding of the transformer 78 to the anode of the valve 73 whereas the brush 80 is connected directly to the anode of the valve 74. The distributor 75 for the armature winding 63 has a small odd cardinal number of conductive segments so that relatively high voltage gradients appear between these segments. The electric valve converting apparatus operates to commutate the current from one brush to another of each pair of brushes prior to the time that one of the brushes leaves a conductive segment. Thus brush and commutator difficulties prevalent heretofore in the prior art are avoided since the brushes do not interrupt any current. The alternating current source 61 supplies the necessary commutating voltage for transferring the current between the valves 67 to 72, inclusive, and in order that a commutating voltage may be supplied to the valves 73 and 74 a transformer 78 is employed. During the running operation the armature 63 also supplies a component of commutating voltage which obviously is introduced into the circuit for the valves 67 to 72 and the valves 73 and 74 by direct conduction and by means of the transformer 78. The control circuit for the electric valves has not been shown since it will be apparent to those skilled in the art that any one of a number of suitable control circuits may be utilized as long as this circuit includes some means for controlling the conductivities of the valves in accordance with the speed of the armature 63. Therefore I have indicated the necessary element of the control circuit by a pair of distributors 81 and 82. Each of these distributors contains five conductive segments which are connected respectively to the common cathode circuit for the group of valves 67 to 69 and the group of valves 70 to 72, respectively. The distributor 81 has a single brush which controls the energization of the control electrodes of the valves 67, 68, 69 and 73 and similarly the distributor 82 has a single brush which controls the valves 70, 71, 72 and 74. These valves are controlled by having a suitable source of control potential, the application of which is determined by the action of the distributors 81 and 82. While series field excitation has been shown for the motor 62, it of course will be apparent that shunt field excitation could be utilized by energizing the field 64 from a separate source of current.

In Fig. 6 I have shown another modification of a direct current motor 83 which is energized from a single phase source of alternating potential 84. The motor 83 is provided with a field winding 85 and a closed armature winding 86. The armature winding 86 is provided with a commutator having a small cardinal odd number of conductive segments so that relatively high voltage gradients appear therebetween. Two input brushes 88 and 89 and two output brushes 90 and 91 are provided for cooperation with the commutator 87. The alternating current supply 84 is connected to a transformer having a primary winding 92 and two secondary windings 93 and 94. The outer extremities of the secondary winding 93 are connected to the anodes of the valves 95 and 96 and the cathodes of these valves are connected to the input brush 88. The outer extremities of the secondary winding 94 are each connected to one of the anodes of the valves 97 and 98, and the cathodes of these valves are connected to the input brush 89. The output brush 90 is connected through one winding of an inductor 99 to an intermediate point on the secondary winding 93 and the output brush 91 is connected through the other winding of the inductor 99 to an intermediate point on the secondary winding 94 of the transformer. From this circuit arrangement it will be seen that a relatively small number of electric valves can be utilized for controlling the commutation of current from one brush to another prior to the time that the brush leaves its conducting segment and hence a machine corresponding to the conventional type of direct current motor modified only to the extent of having a small number of segments in the commutator may be utilized at a relatively high voltage. The inductor 99 serves to maintain the sum of the currents at a constant value so as to smooth out any ripple produced by the alternating input voltage. While the arrangement shown in Fig. 6 utilizes a single phase source of current, of course it will be apparent to those skilled in the art that a similar arrangement may be utilized for a polyphase source of alternating current.

The arrangement shown in Fig. 7 shows another manner in which a relatively small number of electric valves may be utilized to energize a direct current motor 100 from an alternating current source of potential 101. In this instance the motor 100 is provided with a field winding 102 and two armature windings 103 and 104 which are closely coupled magnetically. Each of the armature windings is connected to a separate distributor having a small even number of conductive segments and insulating segments. Thus the armature winding 104 is connected to a distributor 105 and the armature winding 103 is connected to the distributor 106. Each of these distributors 105 and 106 is provided with an input brush and an output brush and all the brushes are mounted in a common plane through the axis of the armature. While the input and output brushes of these two distributors are mounted in a common mechanical plane they are, however, electrically displaced from each other relative to their connections to the armature windings 103 and 104. The alternating current circuit 101 is connected to an inductive winding 107 the midpoint of which is connected through the field winding 102 to the output brushes of the distributors 105 and 106. One extremity of the inductive winding 107 is connected through the valve 108 to the input brush of the commutator 105 and this same terminal of the inductor 107 is connected through an electric valve 109 to the input brush of the distributor or commutator 106. The other extremity of the inductive winding 107 is connected through an electric valve 110 to the input brush of the commutator 105 and this same terminal of the inductive winding 107 is connected through an electric valve 111 to the input brush of the commutator or distributor 106. By providing two armature windings in the machine 100 it will be seen that the operation of the motor 100 will be analogous to the motor 83 since these two armature windings produce an operation which is analogous to the operation produced by the inductor 99 and the two transformer windings 93 and 94 of Fig. 6.

That the method of control disclosed in connection with Fig. 1 may be applied to an alternating current motor of the synchronous type is disclosed in Fig. 8, wherein the alternating current supply source 112 and the motor 113 of the synchronous type are interconnected by an electric valve converting apparatus. The motor 113 is provided with a plurality of armature windings 114 and 115 and a field winding 116. The field winding 116 is separately excited from a source of D. C. through resistor 118. An inductor 117 is connected in series between intermediate points on the armature windings 114 and 115. The motor 113 is interconnected with the source of alternating current 112 by an electric valve converting apparatus which includes a plurality of electric valves 119 to 126, inclusive. One terminal of the armature winding 114 is connected to the cathodes of the valves 119 and 120 the anodes of which are connected to different conductors of the alternating current supply circuit 112. Another terminal of the armature winding 114 is connected to the cathodes of the valves 121 and 122 the anodes of which are connected to different conductors of the alternating current supply circuit 112. One terminal of the armature winding 115 is connected to the anodes of the valves 123 and 124 the cathodes of which are connected to different conductors of the circuit 112, and similarly the remaining terminal of the armature winding 115 is connected to the anodes of the valves 125 and 126 the cathodes of which are connected to different conductors of the alternating current supply circuit 112. The various valves 119 to 126 are controlled by a control potential which is supplied through the control electrodes of these valves in accordance with the speed of operation of the motor 113 with the load current and with a manual adjustment for maximum speed. While for the purposes of simplicity each of the valves 119 to 126 has been shown as being of the type having an anode, a cathode and a control grid, it will of course be understood by those skilled in the art that any of the valves commonly used may be utilized although it is desirable to utilize valves having an anode, a cathode and a control electrode enclosed within an envelope containing an ionizable medium. The alternating potential which is supplied to the control circuit for these various valves is obtained by an inverter apparatus energized from a source of direct current 127 through a current limiting resistor 128 and a smoothing reactor 129. This apparatus comprises an inverter utilizing the electric valves 130 and 131 together with an output inductive winding 132 the midpoint of which is connected to one side of the direct current circuit 127. The cathodes of the valves 130, 131 are connected to the other side of the direct current circuit 127. A suitable commutating potential for this inverter is derived from the alternating current circuit 112 and this potential is impressed upon the output circuit of the valves 131 and 132 by a transformer 134. The output voltage of the electric valve inverting apparatus is impressed across the primary winding of a transformer 135 which has a resistor 136 connected in parallel thereto. The secondary winding of the transformer 135 is connected in series with a distributor mechanism 137 and the common connection from the primary winding to the plurality of control transformers 138 to 141, inclusive. The energization of the primary windings of these control transformers is determined by the distributing means 137 which is mounted upon the shaft of the motor 113. The primary windings of the control transformers 138 to 141 inclusive are controlled in accordance with the potentials appearing across a plurality of resistors 142 to 145 inclusive, and which potential is controlled in turn by the distributor means 137 which is provided with a conductive segment and four brushes each of which is connected to a terminal of a different one of the resistors 142 to 145 inclusive. Each of the control transformers 138 to 141 is provided with two secondary windings each of which is connected through a suitable source of biasing potential and a current limiting resistor to one of the control electrodes of its associated valve. Thus, for instance, the control transformer 138 has one of its secondary windings connected in series with the current limiting resistor 146 and a suitable source of biasing potential 147 so as to energize and control the control electrode of the valve 119.

In accordance with my invention certain predetermined output characteristics for the motor 113 may be obtained by determining the phase of the alternating current output of the inverter utilizing the valves 130 and 131. The phase of the output voltage of this inverter is determined by varying a direct current bias included in the control circuit for the valves 130 and 131. A suitable control potential for these valves is derived from a phase shifting apparatus 148 which is connected to energize the primary winding of the transformer 149. The adjustment of this phase shifting apparatus 148 determines the maximum speed of the motor. One terminal of the secondary winding of the control transformer 149 is connected through the unilaterally conductive device 150 to the control grid or electrode of the valve 130, and similarly the other terminal of the secondary winding of the transformer 149 is connected through the unilaterally conductive device 151 to the control grid or electrode of the valve 131. These unilaterally conductive devices 150 and 151 connected in the circuits to the grids of the valves 130 and 131 prevent a strong positive ion current from reaching the negative grid of one of the tubes thereby overloading the grid control circuit. An intermediate point for the secondary winding of the control transformer 149 is formed by utilizing two unilaterally conductive devices 152 and 153 connected in opposite sense, thus establishing the potential of this point as equal to the potential of the positive of the two terminals of the secondary winding. Between the juncture of these two unilaterally conductive devices and the cathodes of the valves 150 and 151 there is supplied a plurality of components of positive and negative bias which determine the time at which the valves 130 and 131 are to become conductive thereby controlling the phase of the output voltage appearing across the primary winding of the transformer 135. The various biasing components which are effective between the cathodes of the valves 130 and 131 and the juncture point between the unilaterally conductive devices or contact rectifiers 152 and 153 operate to determine the power output characteristics of the motor 113. One component of bias voltage which is responsive to an electrical condition of the motor 113 is obtained by connecting an adjustable resistor 154 across one of the armature windings of the motor 113, such as for example armature winding 114. A portion of the voltage appearing across the adjustable resistor 154 is impressed upon the primary winding of the transformer 155 the secondary winding of which is connected to a bridge rectifier 160 which supplies to the control circuit of the valves 130 and 131 a positive bias potential component. This positive bias potential component is proportional to the voltage of the winding 114 of the motor 113 which is proportional to the speed of the motor. Another adjustable resistor 161 is arranged to be energized from the alternating current circuit 112 and a portion of the voltage appearing across this adjustable resistor 161 is connected to energize the primary winding of a transformer 162. The secondary winding of the transformer 162 is connected to a bridge rectifier 163 which supplies to the control circuit of the valves 130 and 131 a constant positive bias. This constant positive bias supplied by the bridge rectifier 163 is connected in series with the output of the bridge rectifier 160 and the resultant voltage appears across a resistor 164 which is bypassed by a capacitor 165 so as to filter the positive bias voltage and render its ripple relatively small. Another direct current component which is proportional to the current supplied to the electric valve converting apparatus is obtained by connecting the current transformer 166 in series with one conductor of the alternating current circuit 112. The secondary winding of the current transformer 166 is connected to impress a potential upon a resistor 167 which may be bypassed by a capacitor 168. This potential is connected to a bridge rectifier 180. This bridge rectifier 180 normally supplies a negative bias component which appears across a resistor 181. The resistor 181 and the resistor 164 are connected in series and complete the circuit between the intermediate point obtained between the unilaterally conductive devices 152 and 153 and the cathodes of the valves 130 and 131. By suitable adjustment of the adjustable resistors 154 and 161 various families and types of curves for the operation of the motor 113 may be obtained. It is believed that no further explanation is necessary for this embodiment of my invention since the operation of the control circuit in response to the various biasing components will be analogous to the operation of the system shown in Fig. 1.

While I have shown and described particular embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. The combination of a source of power, a dynamo-electric machine, an electric valve converting apparatus interconnecting said machine with said source, a control circuit for said valve converting apparatus including a source of variable phase control voltage, means for producing a positive bias responsive to an electrical condition of said machine, means for producing a negative bias responsive to the current supplied to said valve apparatus, a source of constant positive bias, means for combining voltage components from said sources of bias voltages to control the phase of said source of control voltage, and means for varying the relative amounts of the voltage components so combined thereby to produce certain predetermined output characteristics of said dynamo-electric machine.

2. The combination of a source of power, an electric motor, an electric valve converting apparatus interconnecting said motor with said source, a control circuit for said valve converting apparatus including a source of variable phase control voltage, means for controlling the application of said voltage in accordance with the speed of said motor, means for producing a positive bias responsive to the speed of said motor, means for producing a negative bias responsive to the load of said motor, a source of constant positive bias, means for combining voltage components from said sources of bias voltages to control the phase of said source of control voltages, and means for varying the relative amounts of the voltage components so combined thereby to produce certain predetermined output characteristics of said motor.

3. The combination of a source of alternating current, a motor, an electric valve converting apparatus interconnecting said source and said motor, a control circuit including a source of variable phase rectangular wave shaped control voltage, means responsive to the speed of said machine for producing a positive bias, means for producing a substantially constant positive bias, means for producing a negative bias which varies in magnitude with the current supplied to said valve converting apparatus, and means responsive to the resultant of said bias voltages for controlling the phase of said rectangular wave shaped control voltage.

4. The combination of a source of power, a dynamo-electric machine, an electric valve converting apparatus interconnecting said machine with said source, a control circuit for said valve converting apparatus including a source of variable phase periodic control potential, means for controlling the application of said potential in accordance with the speed of said machine, means responsive to speed in excess of a predetermined amount for maintaining the phase of said periodic control potential substantially constant, and means responsive to the speed of said machine below said predetermined amount for controlling the phase of said periodic control potential in accordance with the flow of current from said source of power to said electric valve converting apparatus.

5. The combination of a source of power, an electric motor, an electric valve converting apparatus interconnecting said motor with said source, a control circuit for said valve converting apparatus including a source of variable phase periodic rectangular shaped control voltage, means for controlling the application of said voltage in accordance with the speed of said motor, means responsive to an electrical condition of said motor for producing a positive bias, means responsive to the energy transmitted to said electric valve converting apparatus for producing a negative bias, a source of constant positive bias, means for combining voltage components from said sources of bias voltages to control the phase of said source of control voltage, and means for varying the relative amounts of the voltage components so combined thereby to produce certain predetermined output characteristics of said motor.

6. The combination of a polyphase network energized from a source of alternating current, a motor having a field winding and a closed armature winding, a commutator comprising a relatively small number of insulating segments and conductive segments, said conductive segments being connected to said armature windings, a pair of input brushes, a pair of output brushes, each brush having a width less than the width of said insulating segments and each brush of each pair being angularly displaced from the other brush relative to said armature windings, a group of electric valves for each of said input brushes for interconnecting said brushes with said polyphase network, an electric valve for each of said output brushes for interconnecting said field winding with said polyphase network and said armature winding, means for commutating the current between said valves, and means for controlling the conductivities of said valves in accordance with the position of said conductive segments relative to said pairs of brushes.

7. The combination of an alternating current network energized from an alternating current source, a motor having a field winding and a closed armature winding, a commutator comprising a relatively small number of insulating segments and conductive segments, said conductive segments being connected to said armature winding, a pair of input brushes, a pair of output brushes, each brush thereof having a width less than the width of said insulating segments, each brush of each pair being angularly displaced from the other brush thereof relative to said armature winding, a group of valves for each of said input brushes, said valves interconnecting said input brushes with said alternating current network, and means connecting a neutral point on said alternating current network through said field winding with said pair of output brushes, and means for controlling the conductivities of said valves in accordance with the positions of said conductive segments relative to said pairs of brushes.

8. The combination of an alternating current network energized from an alternating current source, a motor having a field winding and a pair of closed armature windings closely magnetically coupled, a commutator for each of said windings each comprising a relatively small number of insulating segments and conductive segments, said conductive segments being connected to said armature windings, a pair of input brushes, a pair of output brushes, said brushes all being mounted in a common plane, each brush thereof having a width less than the width of said insulating segment, a group of valves for each of said input brushes, said valves interconnecting said input brushes with said alternating current network, means connecting a neutral point on said alternating current network through said field winding with said pair of output brushes, and means for controlling the conductivity of said valves in accordance with the position of said conductive segments relative to said pairs of brushes.

9. In combination, electric translating apparatus including a pair of electric valve means each having an anode, a cathode and a control member for controlling the conductivity thereof, an excitation circuit for selectively rendering said electric valve means conductive including a source of alternating voltage comprising a winding having a pair of terminal connections, a pair of unidirectional conducting devices each connected between a different one of said connections and a different one of the control members, a second pair of serially connected unidirectional conducting devices connected across said terminal connections and being connected in opposition, the common juncture of said second pair of connections being at the potential of the more positive connection of said pair of connections, and a control circuit connected between the cathodes of said electric valve means and said common juncture to control the conductivities of said electric valve means.

10. In combination, electric translating apparatus including a pair of electric valve means each having an anode, a cathode and a control member for controlling the conductivity thereof, an excitation circuit for selectively rendering said electric valve means conductive including a source of alternating voltage comprising a winding having a pair of terminals, a pair of unidirectional conducting devices each connected between a different one of said terminals and a different one of the control members of said electric valve means, a pair of serially connected opposing copper oxide rectifiers connected across said terminals, the common juncture of said copper oxide rectifiers being at substantially the same potential as that of the more positive of said terminals, and a control circuit connected between said common juncture and the cathodes of said electric valve means.

WILLEM F. WESTENDORP.